United States Patent

[11] 3,527,197

| | | | |
|---|---|---|---|
| [72] | Inventors | Ray W. Ware | |
| | | San Antonio, Texas; | |
| | | Charles J. Laenger, San Antonio, Texas; | |
| | | Thomas E. Owen, San Antonio, Texas | |
| [21] | Appl. No. | 543,569 | |
| [22] | Filed | April 19, 1966 | |
| [45] | Patented | Sept. 8, 1970 | |
| [73] | Assignee | Southwest Research Institute | |
| | | San Antonio, Texas | |
| | | a trust estate of Texas | |

[54] INDIRECT BLOOD PRESSURE MEASUREMENT
11 Claims, 15 Drawing Figs.

[52] U.S. Cl. .................................................... 128/2.05
[51] Int. Cl. ..................................................... A611 5/02
[50] Field of Search ......................................... 128/2, 2.05, 24.05 (Digest)

[56] References Cited
UNITED STATES PATENTS

| | | | |
|---|---|---|---|
| 3,101,082 | 4/1963 | Steen et al. ................... | 128/2.05 |
| 3,189,023 | 6/1965 | Salz et al. .................... | 128/2.05 |
| 3,310,049 | 3/1967 | Clynes ......................... | 128/2.05 |
| 3,315,662 | 4/1967 | Buffington .................... | 128/2.05 |
| 2,865,365 | 12/1958 | Newland et al. .............. | 128/2.05 |
| 3,219,035 | 11/1965 | Pressman et al. ............. | 128/2.05 |

OTHER REFERENCES
Satomura: "Journal of the Acoustical Society of America," vol. 29 No. 11, November 1957, pp. 1181–1185.

*Primary Examiner*—William E. Kamm
*Attorneys*—Samuel L. Welt, Jon S. Saxe, Bernard S. Leon and Jacob Frank ABSTRACT: An indirect blood pressure measurement method and apparatus having a mechanism for externally occluding an artery with calibrated pressure, and detecting arterial wall motion coincident with the opening and closing of the artery in response to coaction of arterial pressure with occluding pressure. In the preferred embodiment, ultrasonic energy is directed to the artery and the ultrasonic Doppler technique is utilized for detecting the arterial wall motion.

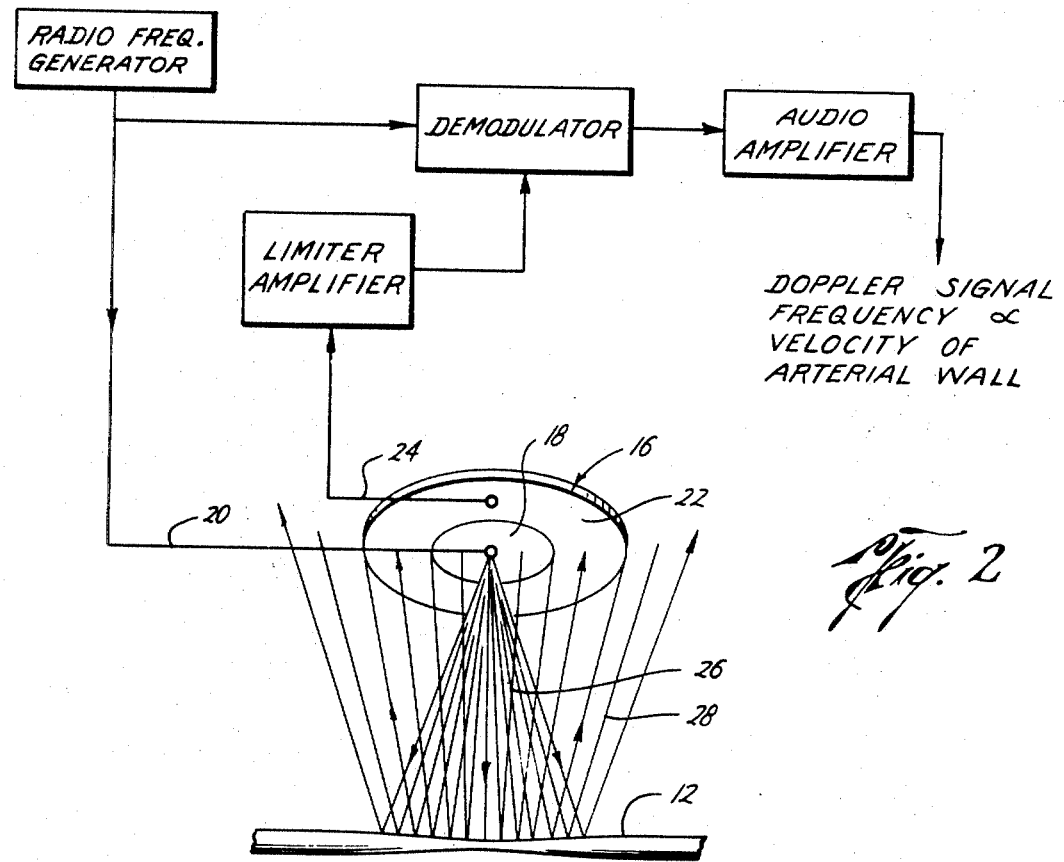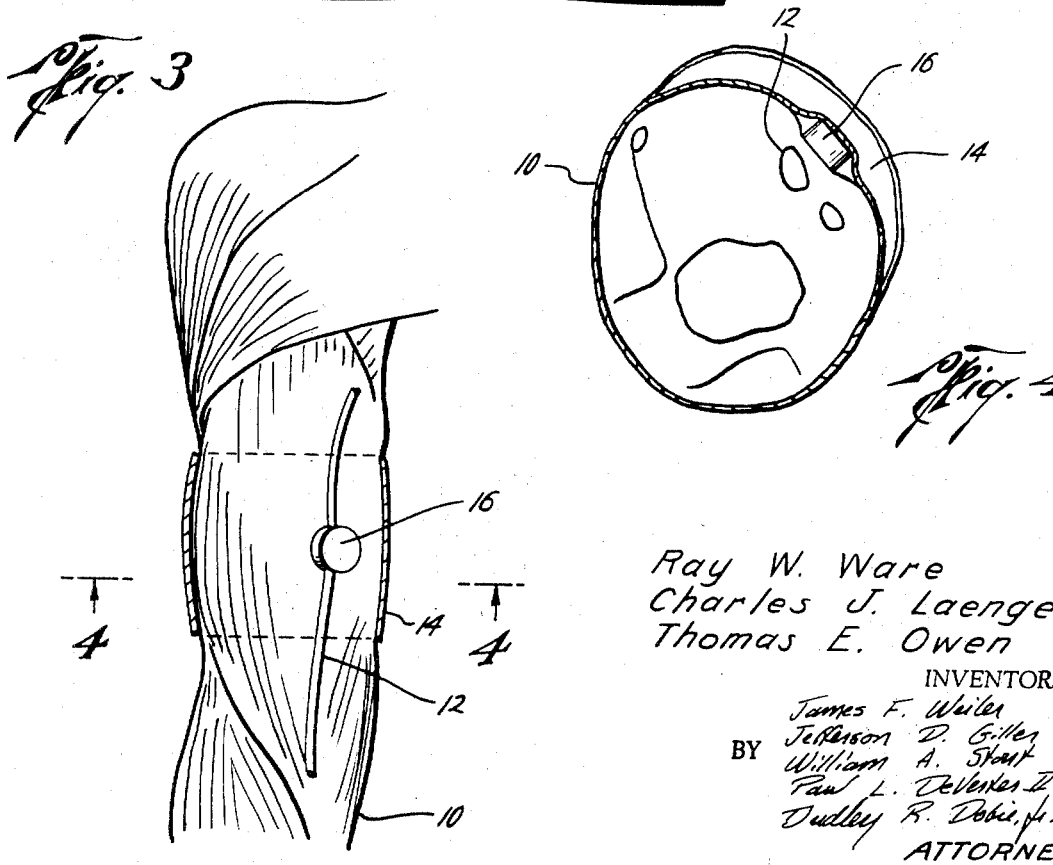

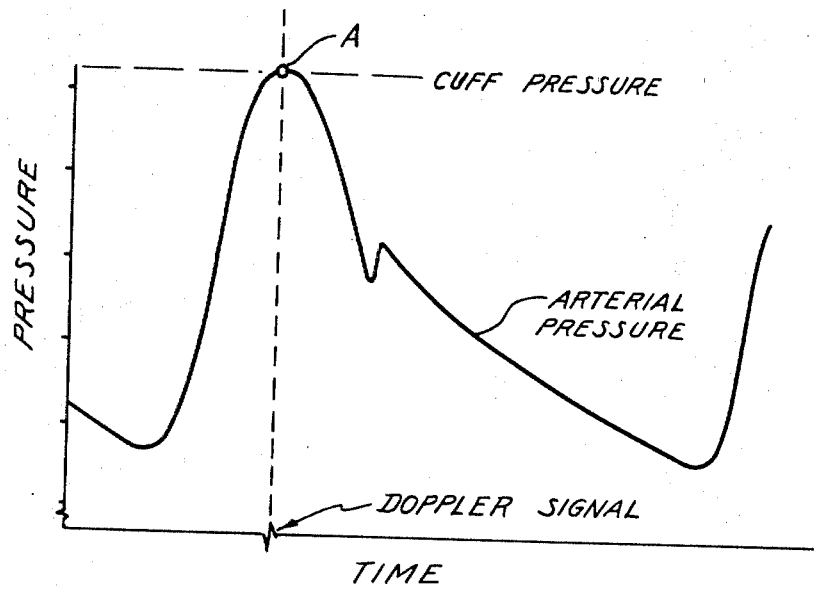
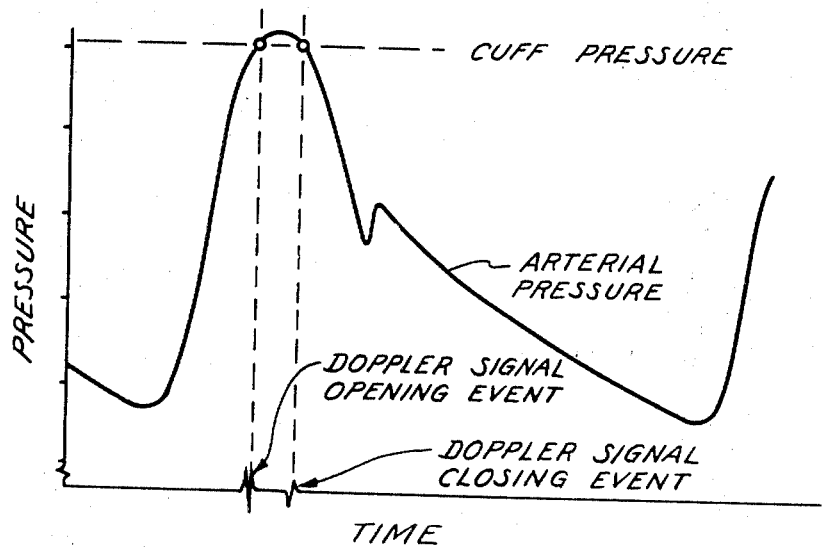
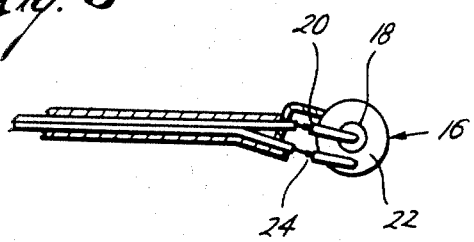

Ray W. Ware
Charles J. Laenger
Thomas E. Owen
INVENTORS

James F. Weiler
Jefferson D. Giller
BY William A. Stout
Paul L. DeVerter II
Dudley R. Dobie, Jr.
ATTORNEYS

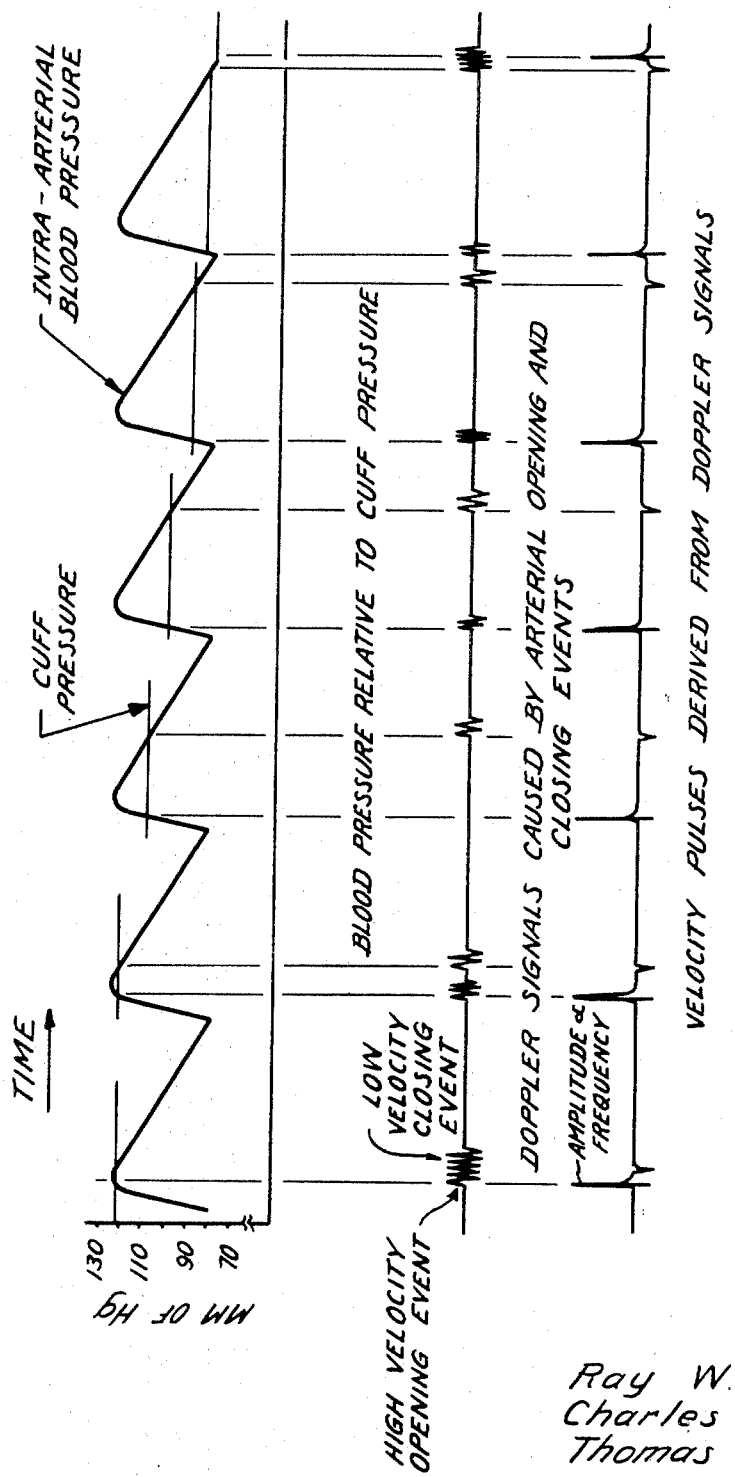

INDIRECT BLOOD PRESSURE MEASUREMENT

The present invention relates to indirect blood pressure measurement, and more particularly, to a method and apparatus for determining blood pressure by measuring the change of shape of an artery with each cardiac cycle and translating such measurement to indirect blood pressure accurately and with minimum interference from environmental conditions.

The standard clinical method of indirect blood pressure measurement is based on the method of Korotkoff described in 1905. Present interpretation of the mechanism allowing estimation of intra-arterial pressure by the method of Korotkoff is as follows: A blood pressure cuff encircling the member containing the artery in question is inflated to a pressure exceeding the peak intra-arterial blood pressure plus resilient forces of arterial tissues (such forces are small enough to be neglected for practical purposes). As the cuff pressure is slowly released, blood begins to flow in a pulsatile manner under the cuff as soon as the cuff pressure has decreased below the peak (systolic) intra-arterial pressure. As cuff pressure continues to decrease, there will be pulsations of blood flow with each heartbeat and the artery will open during that portion of the cardiac cycle in which instantaneous intra-arterial pressure is greater than the cuff pressure. As the cuff pressure decreases below the minimum intra-arterial pressure (diastolic), the artery remains open continuously. By use of a stethoscope, sounds can be heard downstream from the constricting blood pressure cuff during the time that the pressure within the cuff is below the peak intra-arterial (systolic) pressure and above the minimum (diastolic) pressure. These sounds are believed to be due in part to turbulence occurring as blood flows from the constricted segment of the artery under the cuff to the unconstricted distal arterial segment. Simultaneous observation of cuff pressure, and appearance and disappearance or muffling of these "Korotkoff" sounds allows inference of the systolic and diastolic intra-arterial blood pressures. This method, although relatively accurate and convenient, suffers in the presence of ambient noise and/or motion of the subject. Techniques have been developed to minimize the influence of subject motion and ambient noise but not all artifacts can be eliminated from this method.

Disadvantages of the Korotkoff method have accented the need to develop a more nearly artifact-free method of measuring blood pressure indirectly for use in physiologic monitoring systems in surgery as well as in numerous other situations where intensive care is required during hospitalization of a subject. Although great strides have been made in recent years toward improvement of indirect blood pressure measuring instrumentation, elimination of artifacts due to subject motion, cuff movement and ambient interference has presented problems heretofore unsolved. The method and apparatus of the present invention presents a novel method of indirect blood pressure detection which offers the ultimate prospect of freedom from most of the artifacts plaguing previously described methods. This invention is particularly useful for constant monitoring of patients in an operating room, recovery room, or intensive care ward where false positive and false negative alarms are highly undesirable. Thus there is great need in automatic patient monitoring apparatus for ultra reliable blood pressure measurement techniques.

The present invention is directed to an apparatus and method which may be used advantageously in such critical situations by detecting motion of the wall of any artery constrictable under occlusive pressure during the phase of rapid transition of the wall between open and closed configurations. Systolic blood pressure can be observed from the cuff or bladder pressure at the moment that the occluded artery first begins to change its shape from closed to open momentarily, and diastolic pressure can be observed from the cuff or bladder pressure at the moment that the artery ceases to be occluded during any part of the cardiac cycle. Such changes in arterial wall position are determined preferably by use of a continuous wave Doppler ultrasonic technique. Detection of blood pressure in this way is relatively free from artifact due to ambient noise and, since an ultrasound sensor can be held in place directly beneath the occluded cuff, the subject's motion is of little influence. Moreover, the present invention constitutes an improvement over techniques disclosed by Rodbard, et al. in "Device for Indirect Registration of the Calibrated Arterial Upstroke in Man," Review of Scientific Instruments, Vol. 32, No. 9, pp 1022–1023, September 1961.

It is therefore, an object of the present invention to attain the above advantages in determining blood pressure indirectly by detecting motion of an arterial wall during the phase of its rapid transition from closed to open and open to closed while under occluding pressure.

A further object of the present invention is to determine blood pressure indirectly by means of a beam of harmless energy aimed at an arterial segment and detecting motion of the arterial wall during the phase of its rapid transition from closed to open and open to closed while under occluding pressure. In addition, it is an object of the present invention to define both the opening and closing events precisely with respect to time to more accurately recognize systolic and diastolic events and reject the effects due to artifacts such as subject motion, and acoustical and electrical environmental noise.

It is another object of the present invention to measure blood pressure indirectly by using an ultrasonic beam and the Doppler effect by directly observing motion of any size arterial wall including walls of arteries too small to utilize the Korotkoff method.

Still another object of the present invention is to provide a method of determining blood pressure indirectly without reliance on blood flow, or turbulence thereof, or Korotkoff sounds generated thereby. Conditions causing decreased blood flow will not degrade detection of blood pressure in the present invention as in previous methods.

Yet another object of the present invention is to provide a method of determining blood pressure indirectly wherein the beginning and end of the phase of rapid transition of arterial shape can be identified not only on the basis of appearance and disappearance of characteristic signals but also by characteristic phase relationship of the opening and closing events so that systolic and especially diastolic pressure can be recognized as clear and unmistakable end points, and so that the arterial blood pressure wave can be reconstructed in its entirety.

A further object of the present invention is to provide an apparatus for determining systolic and diastolic blood pressure indirectly by extrapolation from incomplete information that would result from interference with the desired signals at the moment that cuff pressure equals systolic intra-arterial pressure and/or at the moment that it equals diastolic intra-arterial pressure. Other methods result in irretrievable loss of blood pressure information while in the present invention extrapolation from readable signals preserves such information with reasonable accuracy.

Yet a further object of the present invention is to provide a bloodless method for faithful reconstruction and presentation of the entire intra-arterial pressure curve by use of the Doppler effect with a ultrasonic beam as one example of a method to detect motion of an arterial wall under an occlusive cuff during the phase of rapid transition of the wall between open and closed positions, and electronically conditioning resulting signals to derive pulses coincident with such opening and closing events of the arterial segment, said pulses being suitable for use in registration of indirect calibrated arterial pressure upstroke and downstroke, allowing derivation of the entire arterial pressure curve.

Other and further objects, features and advantages will become apparent from the following description of a presently preferred embodiment of the invention, given for the purpose of disclosure, taken in conjunction with the accompanying drawings, wherein like character references designate like parts throughout the several views, and where:

FIG. 2 is a schematic representation of the present invention in more detail;

FIG. 3 is a perspective view of an occlusive cuff and transducer applied to a human subject;

FIG. 4 is a cross-sectional view taken along the line 4—4 of FIG. 3;

FIG. 5 is a plan view of a transducer suitable for adaptation of the present invention;

FIGS. 6 through 13 are graphic representations of blood pressure plotted versus time with occlusive pressure indicated;

FIG. 15 is an illustration of a graphic record of arterial opening and closing events as detected according to the present invention.

Figure 1:
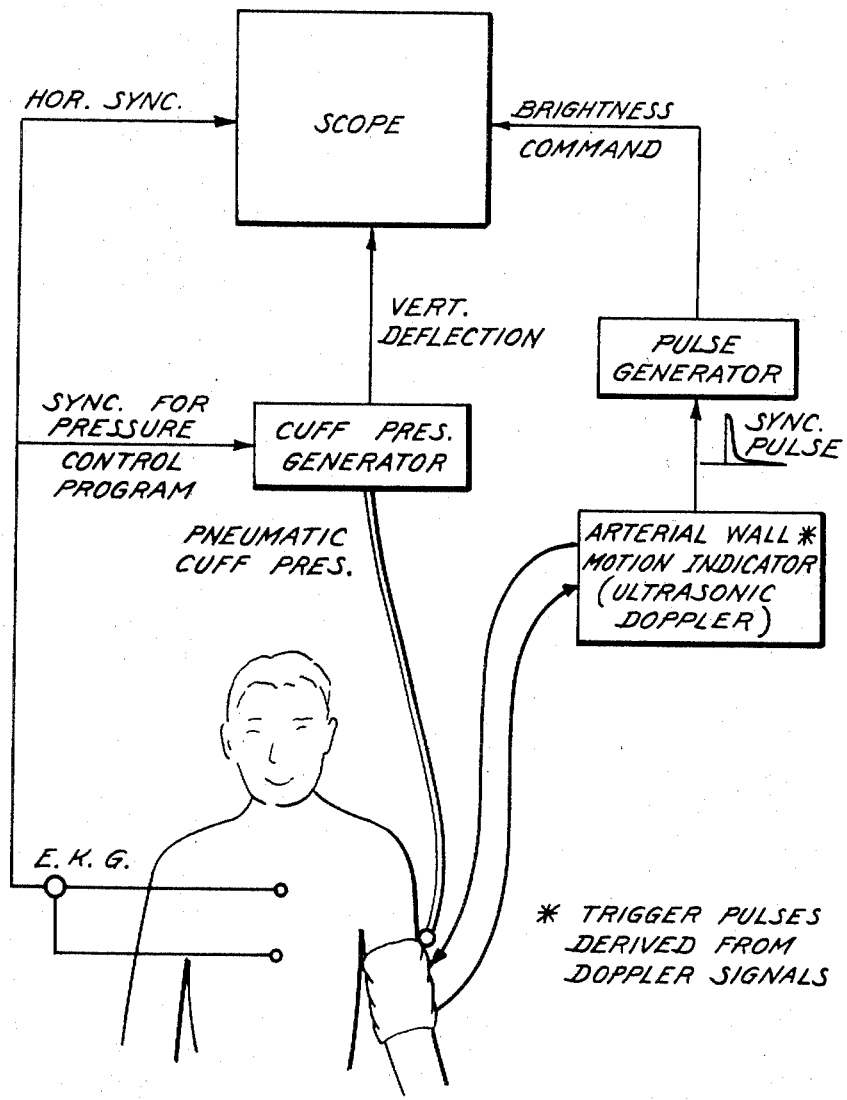
FIG. 1 is a schematic representation of the improvement of the present invention utilizing the ultrasonic Doppler technique for acquiring synchronization signals.
Figure 8:
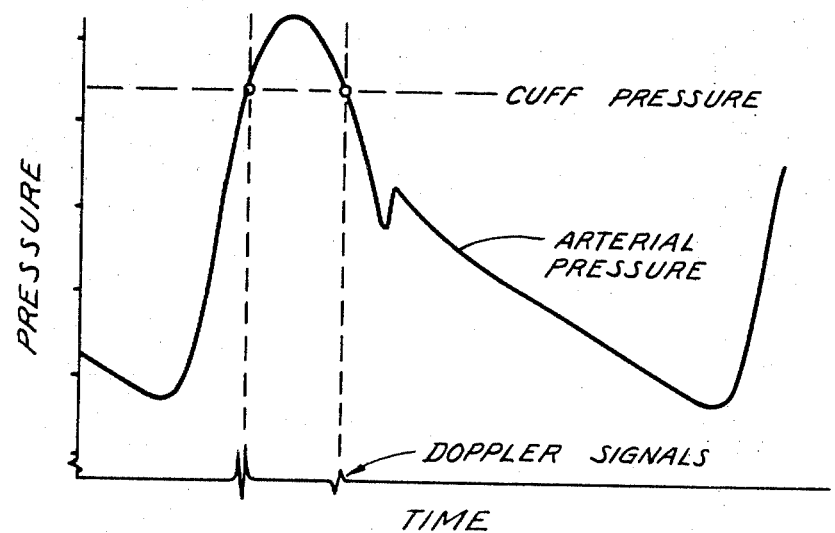
Figure 9:
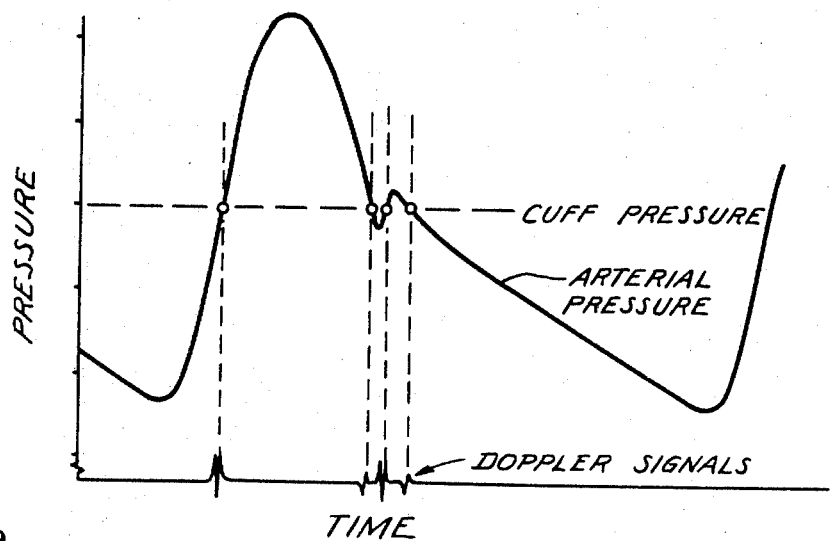
Figure 10:
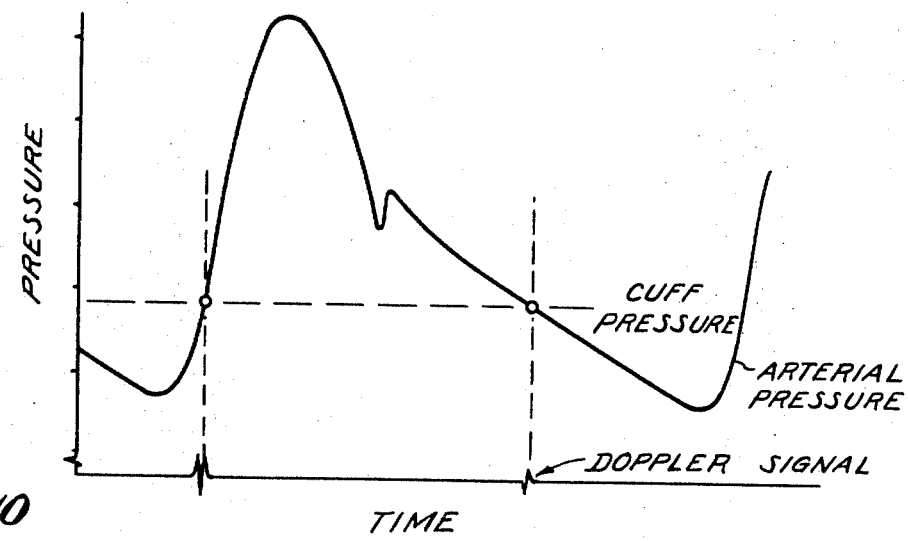

The unique development of the present invention resides in the fact that the motion of the arterial wall during the phase of rapid transition from closed to open and open to closed under occluding pressure is observed directly, for example by means of a beam of harmless energy aimed at the arterial segment in question. In contrast to previous methods, both the opening and closing events are defined precisely with respect to time in this invention so that more accurate recognition of the desired events is possible, with rejection of signals due to artifacts such as subject motion and environmental noise. The schematic of FIG. 1 generally represents means according to the present invention such that arterial opening and closing events allow calibrated reconstruction of the entire blood pressure wave as contrasted with Rodbard's determination of only the upstroke of the wave.

The beginning and end of the phase of rapid transition of arterial shape can be identified not only on the basis of appearance and disappearance of charateristic signals but also by characteristic phase relationship of the opening and closing events just described. This innovation allows new and particularly unmistakable criteria for detecting arterial pressure and wave shape: namely, the increase of dwell time of the artery in the open state as occluding pressure diminishes, and the complementary decrease of dwell time in the closed state. The moment at which closing motion is delayed until it merges with the opening motion due to the next heartbeat clearly marks diastolic pressure as will be explained.

Since detection of blood pressure by this method does not depend on blood flow as do conventional methods, complete freedom from the well known auscultatory gap artifact of auscultatory methods is a distinct advantage. This method may be used effectively on any constrictable artery and even such small arteries such as the temporal artery, the infant brachial artery, the retinal artery, or arteries of small experimental animals as well as on larger arteries. Moreover, the present invention may even be used to measure pressure indirectly within an artery which may be ligated or divided during surgery since the methods herein are not dependent on blood flow as in other methods.

Referring now to FIG. 2, a block diagram is shown of a cardiovascular data acquisition system utilizing ultrasonic signals and the Doppler effect according to the present invention as will be more fully described hereafter. The Doppler effect of course, is a well-known scientific principle, but certain considerations are necessary in applying such effect to the present invention.

When both a transmitter and a target or reflecting surface are stationary, the frequency of any direct echo will equal that of the original transmitted frequency. When the transmitter is stationary and the reflecting surface is moving toward the transmitter, the expression for the frequency impinging upon the reflecting surface can be shown to be as follows:

$$f' = f_T + f_T\left(\frac{v}{c}\right)$$

where
$f_T$ = frequency of transmitted signal
$v$ = velocity of reflecting surface
$c$ = propagation velocity of the particular medium.

This is true because the apparent velocity of the transmission singal becomes $(c+v)$. This apparent change in velocity is manifest as a real change in frequency of the incident energy, that is, the number of cycles received per second. The expression for the frequency of the Doppler component received at the moving reflecting surface is as follows:

$$f_D = f_T\left(\frac{v}{c}\right)$$

The expression for the frequency of the Doppler component in an echo received at the stationary transmitter site can be shown to be approximately as follows:

$$f_D = f_T\left(\frac{2v}{c}\right)$$

Thus, for example, if the surface of an artery moves at a velocity of 5 centimeters per second and an ultrasonic irradiation frequency of 1 megacycle per second is used, the Doppler frequency at that instant will be as follows:

$$f_D = 10^6 \text{ c.p.s.} \frac{(2 \times 5 \text{ cm.})}{1.5 \times 10^5 \text{ cm.}} = 67 \text{ cycles per second.}$$

Figure 13:
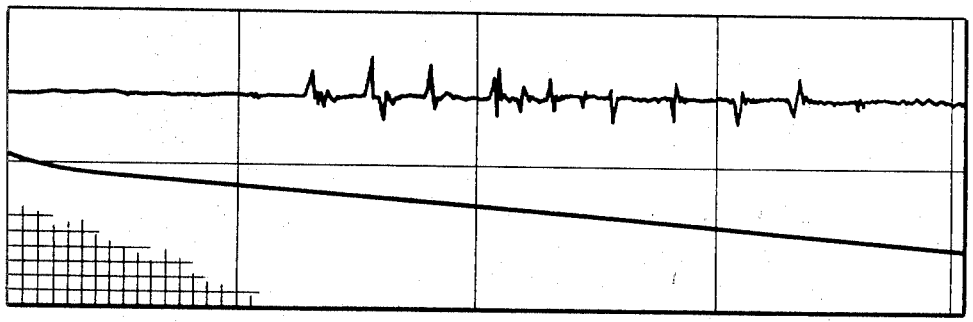

With reference now to FIGS. 3 and 4, a subject's arm 10 with an artery 12 is shown undergoing blood pressure measurement by the present invention with use of an occluding pressure cuff 14, bladder or other suitable occlusion means having an ultrasonic Doppler transducer 16 mounted underneath the cuff to contact skin of the subject adjacent to the segment of the artery in question. Mounting of the transducer 16 underneath the cuff 14 is preferable although not absolutely necessary in practicing the present invention. As occlusive pressure is applied by means of the cuff 14, blood remains completely expressed from that segment of the artery 12 under the cuff when occlusive pressure exceeds systolic pressure of the subject. Then, as pressure is decreased in the cuff 14, blood will momentarily fill that segment of the artery 12 during systole when cuff pressure equals or is slightly less than systolic intra-arterial pressure. As cuff pressure continues to decrease, the artery 12 remains open for longer intervals of time and finally remains open continuously when cuff pressure equals diastolic pressure. FIG. 13 represents these phenomena graphically.

Motion of the wall of the artery 12 may be detected by transmission of an ultrasonic beam by means of the transducer 16. The wall motion causes Doppler signals to be derived from the ultrasonic beam and such Doppler signals are also detected by the transducer 16. It will be recognized that the ultrasonic beam may be pulsed or a continuous wave, the latter being preferable because its employment involves simpler apparatus. More sophisticated ultrasonic Doppler techniques may be utilized to advantage in high noise environments.

Referring now to FIG. 5, the transducer 16 is shown having a suitable transmitting element 18 with a lead 20 and a suitable receiving element 22 with a lead 24. The ultrasonic transducer 16 is mounted flush or nearly so within the underside of the pressure cuff 14 of FIG. 3 to permit reasonable ease of application of the cuff to the subject and reasonable degree of freedom of the cuff from motion and contact artifact.

Referring once again to the schematic diagram of FIG. 1, the Doppler signals derived by virtue of reflection of the ultrasonic beams from the moving arterial wall are used to trigger a suitable one-shot multivibrator (shown generally in the diagram as a pulse generator) and thereby to produce synchronization pulses. The synchronization pulses thus obtained cause spots to appear on a display oscilloscope (represented in the schematic diagram as a scope) by activating the brightness control.

The arterial wall motion indicator of FIG. 1 is shown in detail in FIG. 2. Thus an ultrasonic beam generated by the ultrasonic generator is transmitted by the lead 20 to the transmitting element 18 of the transducer 16. The transmitted beam 26 strikes the wall of the artery 12 whereby an echo beam containing a Doppler component 28 is returned to the receiving element 22 of the transducer 16 and transmitted by lead 24 to suitable amplification means and then to a one-shot multivibrator as explained above in relation to FIG. 1.

With further reference to FIG. 1, the horizontal sweep of the oscilloscope is triggered by a signal derived either from electrical or mechanical ventricular systole and cuff pressure is displayed as vertical deviation of the cathode ray beam, as will be apparent to those skilled in the art.

The system of the present invention is carried into operation by increasing pressure of the occluding cuff 14 above systolic blood pressure. Since intra-arterial pressure can never exceed occluding pressure, no arterial openings or closings occur and therefore the oscilloscope remains blank because the Doppler frequency shift is zero when the reflecting surface of the artery wall is at rest. FIG. 6 graphically represents this phenomenon where occluding pressure approximates systolic blood pressure. The ordinate of the graph represents pressure while the abscissa represents time. The derived ultrasonic Doppler signals are shown on the abscissa base line.

When cuff pressure is just less than systolic blood pressure, the condition of FIG. 7 results. At this point, as intra-arterial pressure momentarily exceeds occlusive pressure, the artery opens causing a Doppler signal. In a similar way, the arterial closing event causes a second Doppler signal. These signals may be displayed by the technique illustrated in FIGS. 14 or 15, or by other convenient means.

Figure 11:
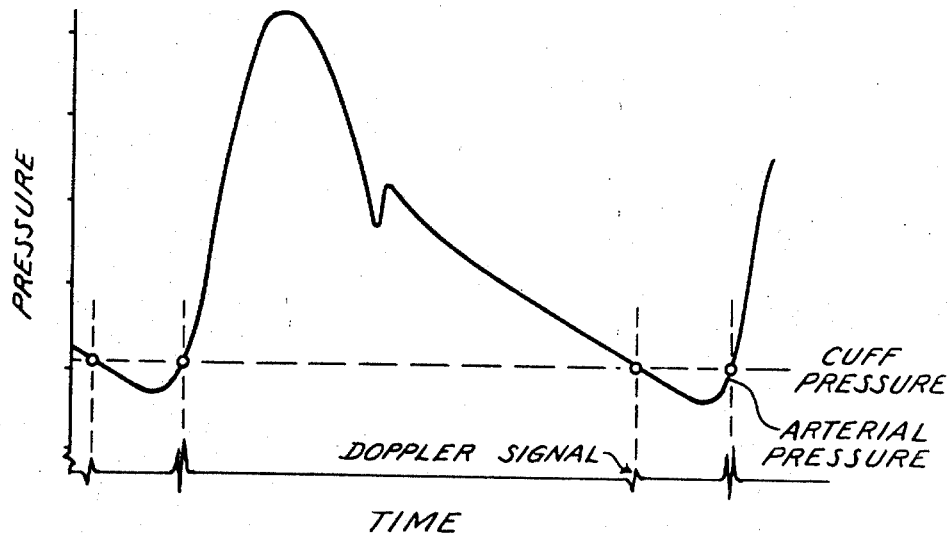
Figure 12:
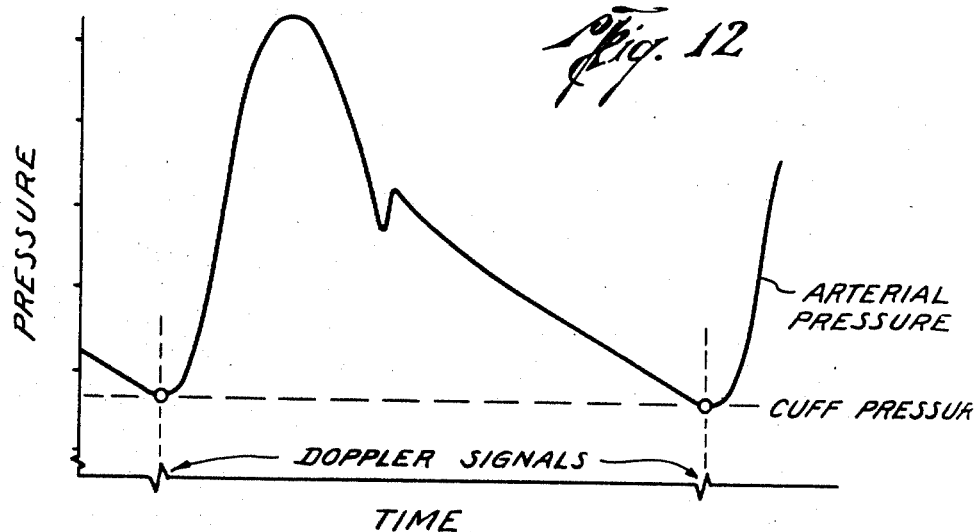

As cuff pressure continues to decrease, the successive configurations as represented in FIGS. 8, 9, 10, 11 and 12 occur. The artery opening and artery closing signals will occur at wider spaced intervals as occlusive pressure decreases. Then when such pressure is slightly greater than diastolic blood pressure as represented in FIG. 11, the greatest separation of the artery opening and closing signals occurs. Actually, the closing event of the artery approaches coincidence with the opening event of the next systole as the occlusive pressure approaches the diastolic blood pressure. Finally, as occlusive pressure equals (represented in FIG. 12) and then becomes less than diastolic blood pressure, no further signals appear since there are no opening or closing events of the artery. FIG. 13 is a composite of the phenomena represented in FIGS 5 through 12.

Figure 14:
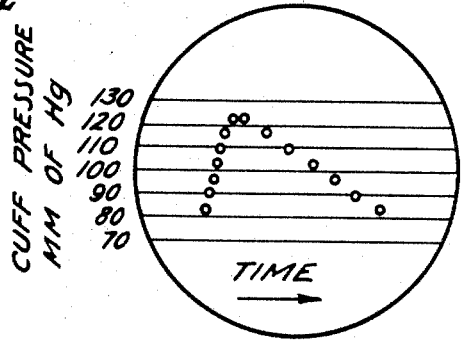
FIG. 14 is an illustration of a blood pressure wave reconstructed by oscilloscope display.

The total intra-arterial blood pressure curve as might be outlined by the bright spots on the oscilloscope is represented in FIG. 14. Advantageously, the oscilloscope display of the blood pressure (ordinate) against time (abscissa) can be calibrated in mm of mercury versus milliseconds after systole.

Thus, it is seen that the present invention advantageously provides an indirect blood pressure measuring device and method which is capable of detecting motion of the wall of an artery under external occlusive pressure during the phase of rapid transition from closed to open and open to closed by means of (as one example) a beam of ultrasonic energy aimed at the artery. Doppler signals or syncronization signals derived therefrom are displayed by suitable indicating means together with occlusive pressure and time from which information blood pressure may be readily determined.

While a preferred embodiment of the present invention has been illustrated, it will become apparent to those skilled in the art that numerous changes and substitutions of devices and of circuitry may be used in practicing the invention. Moreover, the details of operation according to the invention likewise will be apparent to those skilled in the art.

The present invention, therefore, is well adapted to carry out the objects and attain the ends and advantages mentioned, as well as others inherent therein. While a presently preferred embodiment of the invention has been given for the purpose of disclosure, numerous changes in the details of construction, and in the combination, shape, size, arrangement of parts and uses may be resorted to without departing from the spirit and scope of the invention as hereinafter claimed.

We claim:

1. An indirect arterial blood pressure measuring apparatus comprising:
   means for externally occluding an artery with pressure and varying said pressure allowing the artery to open and close;
   means for measuring the occluding pressure;
   transmitting means for directing signals to the artery enabling an arterial wall motion signal to be derived; and
   means for detecting the arterial wall motion signal substantially limited to and coincident with opening and closing of the artery in response to coaction of arterial pressure with occluding pressure.

2. The invention of claim 1 wherein the means for externally occluding the artery comprises an occluding pressure cuff having pressure generating means.

3. The invention of claim 1 wherein
   said transmitting means and detecting means comprise means including a transducer, for transmitting and receiving an ultrasonic signal, and
   said detecting means further includes means coacting with the transmitting and receiving means for conditioning an ultrasonic signal derived coincident with opening and closing of the artery in response to occluding and arterial pressures.

4. The invention of claim 1 wherein,
   the means for externally occluding an artery comprises an occluding pressure cuff adapted to support an ultrasonic transducer in spaced relation with the artery and having pressure generating means, and
   said transmitting means and means for detecting comprise means including the transducer, for transmitting ultrasonic energy and receiving an ultrasonic Doppler signal, mounted underneath said cuff for contact with skin adjacent the arterial wall, and
   said detecting means further includes means coacting with said transmitting and receiving means for conditioning an ultrasonic Doppler signal derived coincident with opening and closing of the artery in response to occluding and arterial pressures.

5. The invention according to claim 4 wherein the means coacting with the transmitting and receiving means for conditioning said ultrasonic Doppler signal derived coincident with opening and closing of the artery in response to occluding and arterial pressures includes:
   means for generating and synchronizing pulses derived from said ultrasonic Doppler signals; and
   means for indicating said pulses.

6. The invention of claim 1 wherein
   said detecting means includes means for providing electrical output signals having frequencies directly proportional to the arterial wall velocity coincident with opening and closing of the artery in response to coaction of arterial pressure with occluding pressure.

7. In an indirect arterial blood pressure measuring apparatus of the type including an occluding pressure cuff having pressure generating means where said pressure is varied allowing an artery to open and close and means for measuring the cuff pressure, the improvement comprising:
   means including a transducer, for transmitting and receiving an ultrasonic signal; and
   means coacting with the transmitting and receiving means for conditioning an ultrasonic signal derived coincident with and substantially limited to opening and closing of the artery in response to cuff and blood pressures.

8. In an indirect arterial blood pressure measuring apparatus of the type including an occluding presure cuff having pressure generating means where said pressure is varied allowing an artery to open and close and means for measuring the cuff pressure, the improvement comprising:
   means including a transducer, for transmitting and receiving an ultrasonic signal;
   means coacting with the transmitting and receiving means for conditioning an ultrasonic signal derived coincident with opening and closing of the artery in response to cuff and blood pressures;

wherein the occluding pressure cuff is adapted to support said transducer; and the transducer is mounted underneath said pressure cuff for contact with skin adjacent the arterial wall.

9. The invention according to claim 8 wherein said means coacting with the transmitting and receiving means for conditioning an ultrasonic signal derived coincident with opening and closing of the artery in response to cuff and blood pressures includes:

means for sensing ultrasonic Doppler signals;

means for generation and derivation of pulses from said Doppler signals; and means for indicating said pulses.

10. A method for determining arterial blood pressure indirectly comprising the steps of:

occluding the artery by external pressure;

varying said external calibrated pressure allowing the artery to open and close;

providing an external energy source for transmitting energy to the artery enabling arterial wall motion signals to be derived; and detecting the arterial wall motion signals substantially limited to and coincident with opening and closing of the artery, and measuring said external pressure.

11. The invention of claim 10 wherein the steps of providing an external energy source for transmitting energy to the artery and detecting arterial wall motion signals coincident with opening and closing of the artery includes:

generating and directing ultrasonic energy toward the arterial wall;

deriving and receiving ultrasonic Doppler signals responsive to arterial wall motion coincident with opening and closing of the artery; and generating pulses derived from said Doppler signals.